United States Patent
Rosakis et al.

[11] Patent Number: 6,031,611
[45] Date of Patent: Feb. 29, 2000

[54] COHERENT GRADIENT SENSING METHOD AND SYSTEM FOR MEASURING SURFACE CURVATURE

[75] Inventors: Ares J. Rosakis, Altadena; Ramen P. Singh, Pasadena; Elizabeth Kolawa, Bradbury; Nicholas R. Moore, Jr., Altadena, all of Calif.

[73] Assignee: California Institute of Technology, Pasadena, Calif.

[21] Appl. No.: 09/090,280

[22] Filed: Jun. 4, 1998

Related U.S. Application Data

[60] Provisional application No. 60/048,541, Jun. 3, 1997.

[51] Int. Cl.[7] ........................................................ G01B 9/02
[52] U.S. Cl. ............................................ 356/354; 356/359
[58] Field of Search ........................................ 356/354, 359

[56] References Cited

U.S. PATENT DOCUMENTS 5,387,795  2/1995  Ishida et al. ............................. 356/359
5,572,323  11/1996  Maeda et al. ........................... 356/356

*Primary Examiner*—Robert H. Kim
*Assistant Examiner*—Andrew H. Lee
*Attorney, Agent, or Firm*—Fish & Richardson P.C.

[57] ABSTRACT

A system and method for determining a curvature of a specularly reflective surface based on optical interference. Two optical gratings are used to produce a spatial displacement in an interference field of two different diffraction components produced by one grating from different diffraction components produced by another grating. Thus, the curvature of the surface can be determined.

18 Claims, 11 Drawing Sheets

COHERENT GRADIENT SENSING METHOD AND SYSTEM FOR MEASURING SURFACE CURVATURE

This application claims the benefit of U.S. Provisional Application No. 60/048,541 filed on Jun. 3, 1997, which is incorporated herein by reference.

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION

The present invention relates to optical detection and probing based on coherent interference, and more specifically, to an optical interferometric technique and system for measuring curvature of a reflective surface.

BACKGROUND OF THE INVENTION

The amplitude and phase of an optical wave usually fluctuate. Coherence of light is used to describe the correlation of the fluctuations between two or more optical waves. Two optical waves are mutually coherent when the fluctuations in the optical waves are completely correlated. Conversely, when the fluctuations in two optical waves are totally uncorrelated, the optical waves are incoherent with respect to each other. In many practical optical systems, two light beams may be partially correlated in amplitude and phase to have a partial coherence.

The degree of coherence of two or more optical waves can significantly affect the total optical field produced by spatially overlapping the optical waves. When mutually incoherent optical waves intercept each other in space, the total optical intensity distribution in the region of superposition is simply a linear summation of the individual intensity distributions. However, if the optical waves are at least partially coherent with respect to one another, interference of the optical waves occurs and produces a non-linear superposition of the individual intensity patterns. This interference causes the intensity distribution of the total optical field to vary spatially between maxima which are larger than the sum of the individual peak intensities, and minima which may be zero due to the complete cancellation of the waves.

Optical interferometry uses the interference of two or more at least partially mutually coherent beams to extract information embedded in at least one of the beams. Various optical interferometers have been developed for measurements and optical probing. The Michaelson interferometer is a classical example of this type. A single monochomatic light source may be used to produce two mutually coherent beams which interfere to produce an interference pattern.

One application of the optical interferometry is characterization of a surface, i.e., surface topography. For example, the flatness or the curvature of a surface can be determined by using optical interferometric techniques. Optical interferometric techniques may be advantageously used to achieve real-time, remote, non-intrusive, full-field measurements of certain surfaces. In particular, an optical interferometric technique for measuring curvature and curvature change can be applied to measurements related to various surfaces in semiconductors, electronic components and other devices.

Determination of effects caused by thermal stress in thin films is one example of such applications. As the electronics industry demand increasingly smaller dimensions of metal interconnections and more complex multilayered structures, mechanical properties and stresses of thin films used for these interconnections become crucial to the lifetimes of ultra large scale integrated circuits. The difficulty in measuring the mechanical properties and stresses of interconnections increases as their sizes decrease. For example, one concern for the interconnection materials is residual stresses as a result of the fabrication process and additional stresses caused by thermal cycling.

Typically, integrated circuit metallization produce multiple layers on a semiconductor substrate (e.g., silicon), often at elevated temperatures. The layers usually exhibit different mechanical, physical and thermal properties which lead to high stresses in interconnection structures. These stresses can cause undesired stress-induced voiding and are directly related to electromigration. In addition, the stresses may cause cracking of the substrate.

Voiding, electromigration, and substrate cracking are among the leading failure mechanisms in integrated circuits. Information regarding stresses, stress distribution, and stress origins is an important step in improving reliability of integrated circuits.

One approach to determine stresses in films uses x-ray diffraction to directly measure strains in polycrystalline materials by measuring d-spacings of a single reflection for several orientations of the sample. This is disclosed in Elements of X-ray diffraction, by Cullity, Addison-Wesley, Reading, Mass. (1978).

Another approach measures substrate curvature or deflection to determine stresses based on a correlation between the curvature change and the stress. The curvature or curvature change may be measured by, for example, scanning a laser beam from point to point on a surface or using a Twyman-Green interferometer with two successive differentiations of the experimental data.

Diffraction of x-rays from single crystal substrates is also commonly used to measure curvatures of certain surfaces. In essence, the change in directions of incident and diffracted beams by a surface caused by a translation of the surface is used to determine the surface curvature. See, for example, Vreeland et al. in Materials Research Society Proceedings, Vol. 30 (3), 1988. The curvature is determined in an averaged sense over the point of initial beam incidence and the point of beam incidence after translation. Since a rigid body rotation may occur during the required specimen translation, a calibration process is usually required to correct the error caused by such rotation. This can be done by using a substantially flat reference specimen of the same crystallographic structure which may be part of the same single crystal wafer under measurement. Hence, the measured curvatures of this technique are relative to the reference specimen.

SUMMARY OF THE INVENTION

The present invention is based on a coherent gradient sensing ("CGS") technique and optical interferometry to measure curvature and curvature change of a specularly reflective surface. A collimated coherent optical beam is used as an optical probe to obtain curvature information indicative of a specularly reflective surface formed of essentially any material. When the reflective surface is curved, the wavefront of the reflected probe beam is distorted and thereby the reflected probe beam acquires an optical path difference or phase change associated with the curvature of the surface under measurement.

Two gratings spaced relative to each other are placed in the path of the reflected probe beam to manipulate the distorted wavefront for curvature measurement. A first grating diffracts the reflected probe beam to spatially separate diffraction components of different spatial frequencies. A second grating further diffracts each diffraction component produced by the first grating. An optical element (e.g., a lens) positioned relative to the second grating combines two selected diffraction components produced by the second grating by diffracting two different diffraction components produced by the first grating. The two selected diffraction components interfere with each other to produce an interference pattern. The diffraction by the two gratings effects a relative spatial displacement between the two selected diffraction components. This allows for extraction of a spatial gradient of the phase distortion caused by the curvature of the reflective surface from the interference pattern. This spatial gradient, in turn, can be further processed to obtain the curvature information.

The two gratings in general may be any gratings, with different grating periods and oriented with respect to each other at any angle. Preferably, the two gratings may be oriented with respect to each other in the same direction so that their rulings are substantially parallel and may be configured to have a substantially identical grating period. This simplifies the data processing.

An optical sensing device, such as a semiconductor photosensing array or a photosensitive medium, is disposed to receive the interference pattern and produce an electrical image indicative of the interference pattern.

A signal processor is connected to receive the electrical image from the photosensitive device and configured to extract a spatial gradient information on the wavefront of said reflected probe beam caused by the curvature of the specularly reflective surface. The signal processor is configured to determine the curvature based on the spatial gradient information.

One aspect of the invention includes controlling the signal processor to extract the curvature of the surface by processing the spatial gradient information. In one embodiment, the signal is programmed to perform at least the following steps: assigning a coordinate system to a digital image converted from the electrical image of the interference pattern; producing a scaling factor to associate dimensions of the digital image to dimensions of the specularly reflective surface under measurement; determining a distribution of fringes in the interference pattern as a function of coordinates in the assigned coordinate system; performing partial derivatives on distribution of fringes in the assigned coordinate system; and determining a curvature tensor for the specularly reflective surface according to the partial derivatives.

The signal processor can be further programmed to determine stresses on the specularly reflective surface according to a correlation between said curvature and said stresses.

A system according to the invention has a number of advantages. For example, the entire area on a reflective surface illuminated by the probe beam can be imaged and processed simultaneously to provide a full-field measurement of curvature so that curvature changes due to time-varying effects and highly localized anomalies can be detected. For another example, such a system is relatively robust with regard to vibrations, rigid body rotation or displacement of a surface under measurement. Only one differentiation operation is needed so that errors associated with differentiation are reduced. Also, the intensity of the probe beam can be controlled at a low power level so that the measurement is non-invasive in order to maintain the integrity of a surface under measurement. Moreover, a range of specularly reflective structures can be measured, including but not limited to patterned lines and dielectric membranes.

These and other aspects and advantages of the invention will become more apparent in light of the accompanying drawings, detailed description of the preferred embodiments, and appended claims.

DETAILED DESCRIPTION OF THE PREFERRED EMBODIMENTS

Figure 1:
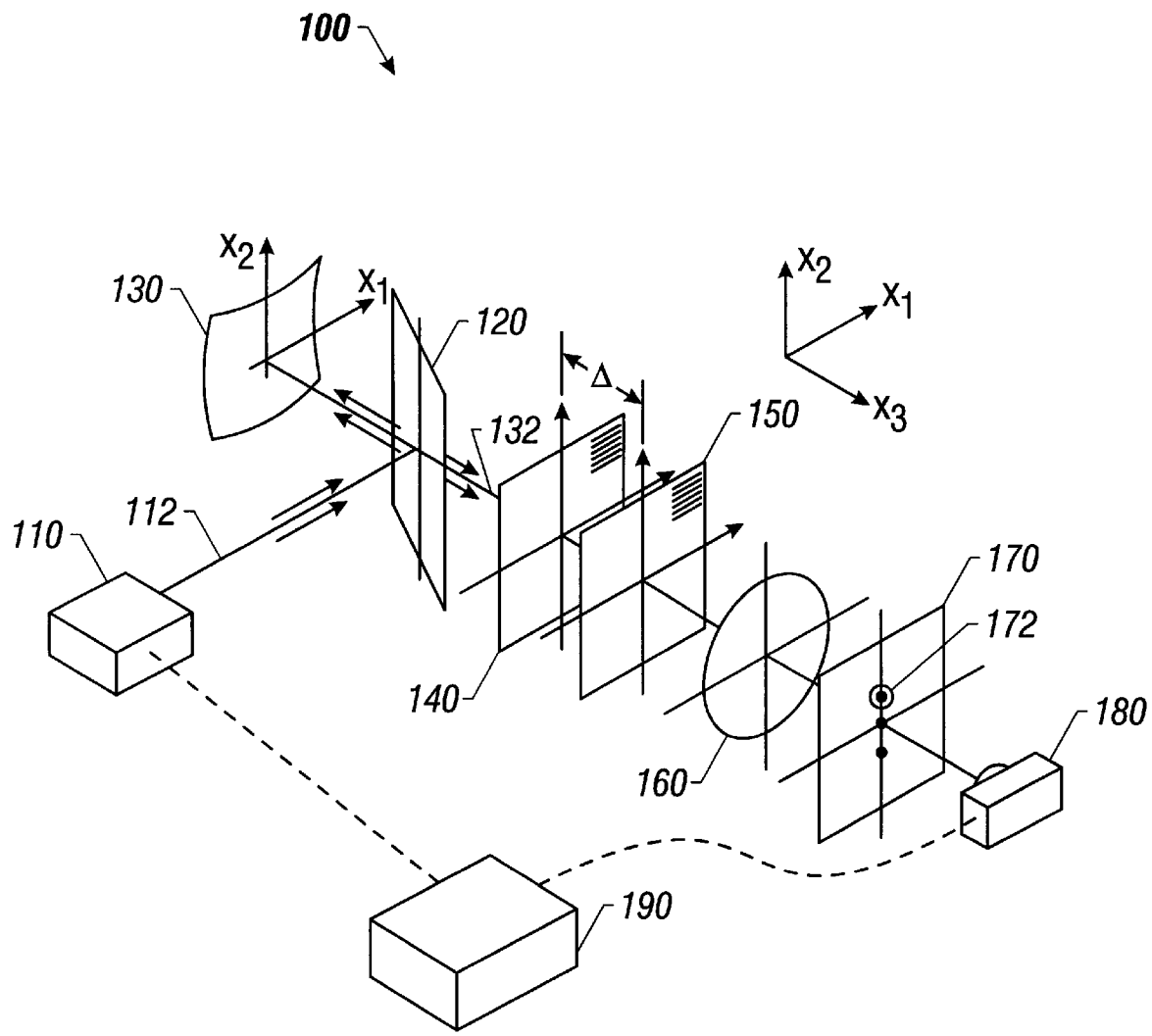
FIG. 1 is a schematic of a system 100 implementing the coherent gradient sensing in a reflection configuration.

FIG. 1 shows a schematic of a system 100 implementing the coherent gradient sensing (i.e., CGS) in a reflection configuration for measuring the curvature of a specimen surface 130 that is specularly reflective and not optically diffusive. The reflective specimen surface 130 can be a uniformly smooth or polished surface or have reflective segments to form patterns and structures therein.

A light source 110 such as a laser produces a coherent, collimated optical probe beam 112. A beam delivering optical element 120 (e.g., a beam splitter) is positioned relative to the specimen surface 130 and the light source 110 to direct the probe beam 112 to the specimen surface 130.

The reflected probe beam 132 from the specimen surface 130 is then directed to a pair of gratings, 140($G_1$) and 150($G_2$) which are separated from each other by a specified distance, Δ. The reflected probe beam 132 is diffracted twice by the gratings 140 and 150 to produce multiple diffracted orders. An optical element 160 is positioned relative to the grating 150 to combine at least two selected diffraction orders produced the from 150 by diffracting two different diffraction orders produced by the grating 140. The two selected diffraction components interfere with each other to produce an interference pattern. In the embodiment of FIG. 1, a lens is used as the optical element 160 to select certain diffraction orders produced by the grating 150 to form distinct diffraction spots on a filter plane 170 which is spaced from the lens by about the corresponding focal length.

A spatial filter 172, such as an aperture as shown, is placed in the filter plane 170 to select a diffraction order of interest and block other signals. The selected diffraction order is then imaged through an imaging lens onto a photosensing device which may include a semiconductor photosensing array of multiple photosensing pixels (e.g., a CCD array) or a photosensing medium (e.g., a photographic film). A camera 180 is shown to represent a combination of the imaging lens and the photosensing medium. The output signal from the camera 180 is processed by a signal processor 190 to extract the curvature information. The signal processor 190 may include a microprocessor which is programmed to perform the data processing. The operation of the light source 110 may also be controlled by the signal processor.

The wavefront of the reflected probe beam 132 is modified by the specimen surface 130 and has information on the surface curvature. The diffraction by the two gratings 140 and 150 effects a relative spatial displacement between the two selected diffraction orders produced by the grating 150. This allows for extraction of a spatial gradient of the phase distortion caused by the curvature of the reflective specimen surface 130 from the interference pattern. This spatial gradient, in turn, can be further processed to obtain the curvature information.

The two gratings 140 and 150 in general may be any gratings, with different grating periods and oriented with respect to each other at any angle. Preferably, the two gratings may be oriented with respect to each other in the same direction and may have the same grating periods to simplify the data processing.

Certain aspects of the CGS system 100 in FIG. 1 are disclosed, for example, by Rosakis et al. in "A coherent gradient sensor for crack tip deformation measurements: analysis and experimental results," International Journal of Fracture, Vol. 48, pp. 193–204 (1991); Rosakis et al. in "Analysis of coherent gradient sensing (CGS) by Fourier optics," Optics and Lasers in Engineering, Vol. 25, pp. 25–53 (1996), and Rosakis in "Application of coherent gradient sensing (CGS) to the investigation of dynamic fracture problems," Optics and Lasers in Engineering, Vol. 19, pp. 3–41 (1993). The disclosure of these references is incorporated herein by reference.

Figure 2:
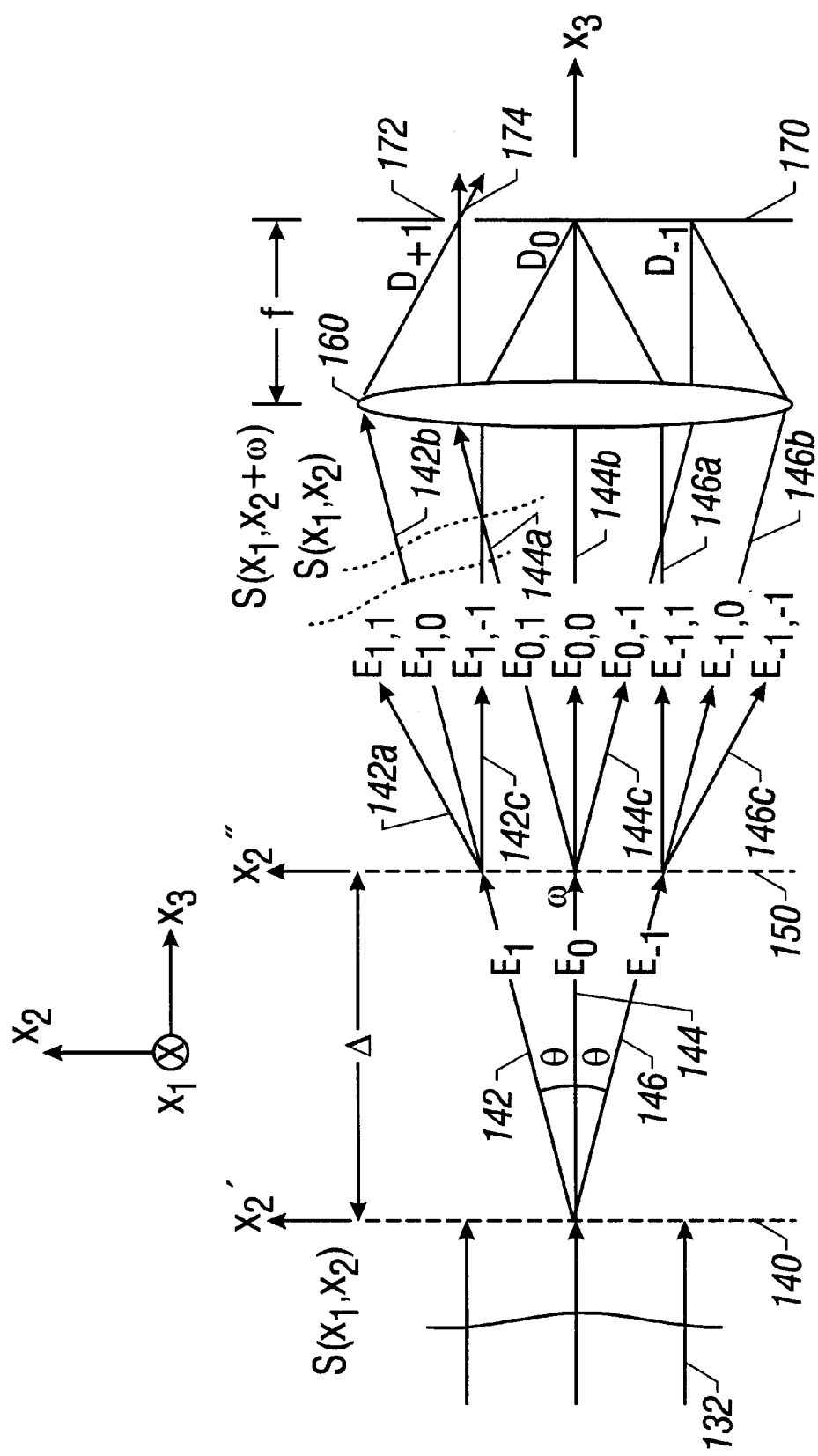
FIG. 2 is a diagram illustrating the working principle of the CGS system shown in FIG. 1 by using two identical gratings aligned parallel to each other.

FIG. 2 illustrates the working principle of the CGS system shown in FIG. 1 in two dimensions by using two identical gratings 140 and 150 aligned parallel to each other. Consider a Cartesian coordinate system $(x_1, x_2, x_3)$ in which the $x_2$ axis is parallel to the grating rulings of both the gratings 140 and 150.

The grating 140 ($G_1$) diffracts the reflected probe beam 132 into several diffraction waves denoted as $E_0, E_1, E_{-1}, E_2, E_{-2}$, etc. For illustrative purpose, only the first three diffraction orders, i.e., zero-order wave 144 ($E_0$), +1-order 142 ($E_1$), and −1-order wave 146 ($E_{-1}$) are shown. Each of these wave fronts is further diffracted by the second grating 150 ($G_2$) to generate multiple wavefronts. For example, the +1-order 142 ($E_1$) is diffracted to produce wavefronts 142$a$ ($E_{1,1}$), 142$b$($E_{1,0}$), 142$c$($E_{1,-1}$), etc.; zero-order 144 ($E_0$) is diffracted to produce wavefronts 144$a$($E_{0,1}$), 144$b$($E_{0,0}$), 144$c$($E_{0,-1}$), etc.; and −1-order 146 ($E_{-1}$) is diffracted to produce wavefronts 146$a$($E_{-1,1}$), 146$b$($E_{-1,0}$), 146$c$($E_{-1,-1}$), etc.

Certain diffracted beams generated by the grating 150 from different diffraction orders generated by the grating 140 are parallel since the two gratings 140 and 150 are identical. This could also occur when the ratio of the grating periods of the two gratings 140, 150 is an integer. Under such conditions, a lens can be conveniently used as the optical element 160 to overlap various sets of parallel diffracted beams emerged from the grating 150 with one another at or near the filtering plane 170 to form multiple diffraction spots. These diffraction spots have interference fringes due to the interference of the overlapped beams. The interference fringes have information indicative of the gradient of the phase distortion in the wavefront of the reflected probe beam 132.

For example, the zero-order diffraction beam 142$b$($E_{1,0}$) originated from the beam 142 is parallel to the +1-order diffraction beam 144$a$($E_{0,1}$) originated from the beam 144. These two beams 142$b$ and 144$a$ are focused to a point 174($D_{+1}$) on the filter place 170 by the lens 160. Similarly, the diffracted beams 142$c$ and 144$b$ overlap and interfere with each other to form a spot $D_0$, and beams 144$c$ and 146$b$ overlap and interfere with each other to form a spot $D_{-1}$, respectively.

The interference pattern of any of these spots has the information of the gradient of the phase distortion in the wavefront of the reflected probe beam 132 and can be used to determine the curvature of the specimen surface 130. The example in FIG. 2 shows the spot 174 ($D_{+1}$) is selected by the aperture 172 in the filter plane.

Assume that the wavefront of the reflected probe beam 132 is approximately planar and has a local phase variation $S(x_1, x_2)$. The net effect of the diffraction by the gratings 140 and 150 is to produce a lateral shift, or "shearing", of the incident wave front along the direction of the gratings, i.e., in the $x_2$-direction. For example, the wavefront of the diffracted beam 142$b$($E_{1,0}$) is shifted by an amount, ω, along the $x_2$-direction as compared to the wave front of the diffracted beam 144$a$($E_{0,1}$) so that the wavefronts of the beams 142$b$ and 144$a$ are given by $S(x_1, x_2+\omega)$ and $S(x_1, x_2)$, respectively. The wave front shift is parallel to the principal axis of the gratings, i.e. along $x_2$ if the grating lines are oriented along $x_1$ as shown in FIG. 2.

The magnitude of the spatial shift ω is a function of the grating separation, Δ, and the diffraction angle, θ, which is identical in both gratings 140 and 150:

$$\omega = \Delta \tan \theta, \quad (1)$$

where the diffraction angle, θ, is determined by the wavelength λ of the reflected probe beam 132 and the grating period, ρ, according to the following relation:

$$\theta = \arcsin \frac{\lambda}{p}. \quad (2)$$

For small values of the diffraction angle θ, Equations (1) and (2) can be approximated as follows:

$$\omega \approx \Delta\theta, \quad (3)$$

$$\theta \approx \frac{\lambda}{p}. \quad (4)$$

The conditions for constructive interference between the diffracted beams 142b and 144a can be expressed as $$S(x_1, x_2+\omega) - S(x_1, x_2) = n^{(2)}\lambda, \quad n^{(2)} = 0, \pm 1, \pm 2, \ldots \quad (5)$$

where $n^{(2)}$ is an integer identifying fringes observed for shearing along the $x_2$-direction. Dividing Equation (5) by $\omega$ gives $$\frac{S(x_1, x_2+\omega) - S(x_1, x_2)}{\omega} = \frac{n^{(2)}\lambda}{\omega}, \quad (6)$$

$$n^{(2)} = 0, \pm 1, \pm 2,$$

which, for a sufficiently small $\omega$, may be approximated as $$\frac{\partial S(x_1, x_2)}{\partial x_2} = \frac{n^{(2)}\lambda}{\omega}. \quad (7)$$

$$n^{(2)} = 0, \pm 1, \pm 2,$$

Substitution of Equations (3) and (4) into (7) leads to $$\frac{\partial S(x_1, x_2)}{\partial x_2} = \frac{n^{(2)}p}{\Delta}. \quad (8)$$

$$n^{(2)} = 0, \pm 1, \pm 2,$$

Hence, for a small diffraction angle $\theta$, shifting of the wavefront along either the $x_1$- or the $x_2$-direction can be approximately expressed as follows, $$\frac{\partial S(x_1, x_2)}{\partial x_\alpha} = \frac{n^{(\alpha)}p}{\Delta}. \quad (9)$$

$$n^{(\alpha)} = 0, \pm 1, \pm 2,$$

where, $n^{(\alpha)}$ represents the number of fringes observed for shearing along the $x_\alpha$-direction and $\alpha\in\{1,2\}$. Equation (9) includes the information of the interferograms based on the CGS technique.

The optical wavefront of the reflected probe beam 132 may be associated with the topography of the specimen surface 130 as follows. Consider a specularly reflective specimen surface 130 as the following function:

$$F(x_1, x_2, x_3) = x_3 - f(x_1, x_2) = 0. \quad (10)$$

A unit surface normal vector N at an arbitrary point $(x_1, x_2)$ of this curved surface $F(x_1, x_2, x_3)$ can be determined by the following:

$$N = \frac{\nabla F}{|\nabla F|} = \frac{f_{,1}e_1 - f_{,2}e_2 + e_3}{\sqrt{1 + f_{,1}^2 + f_{,2}^2}}, \quad (11)$$

where $f_{,\alpha}$ denotes in-plane gradient components of the specimen surface $x_3 = f(x_1, x_2)$, and $e_i$ represents the unit vector along the $x_i$ axis, (i=1, 2, 3).

Consider an initially planar wavefront incident on the specimen surface 130 (i.e., the wavefront of the collimated coherent probe beam 112 which can be represented by $x_3=0$) such that the incident probe wavefront is parallel to the $(x_1, x_2)$ plane. The unit wave propagation vector of the probe wave 112 is defined as a vector $d_0$ normal to the incident wave front:

$$d_0 = -e_3. \quad (12)$$

When the specimen surface 130 is flat and occupies the $(x_1, x_2)$ plane, the unit reflected wave propagation vector d (normal to the wavefront of the reflected probe beam 132) is opposite to the incident vector $d_0$:

$$d = e_3 = -d_0. \quad (13)$$

In general, the specimen surface 130 is curved, the wavefront of the reflected probe beam 132 is perturbed so that the propagation vector d is usually not parallel to $e_3$:

$$d = \alpha e_1 + \beta e_2 + \gamma e_3, \quad (14)$$

where coefficients $\alpha$, $\beta$ and $\gamma$ denote the direction cosines of the reflected (perturbed) wavefront and are in general a function of $(x_1, x_2)$. When the surface 130 is flat, $\alpha=\beta=0$, and $\gamma=-1$ and Equation (14) is reduced to Equation (13).

The law of reflection dictates that unit vectors d, N, $d_0$ are coplanar and are associated with one another by the following relation:

$$d \cdot N = (-d_0) \cdot N = e_3 \cdot N, \quad (15)$$

which leads to the following:

$$d = (2e_3 \cdot N)N - e_3. \quad (16)$$

Substituting Equation (11) into Equation (16) yields $$d = \frac{2(-f_{,1}e_1 - f_{,2}e_2 + e_3)}{1 + f_{,1}^2 + f_{,2}^2} - e_3. \quad (17)$$

The coefficients $\alpha$, $\beta$ and $\gamma$ can be expressed in terms of $f_{,\alpha}$ ($\alpha=1, 2,$ and 3) by comparing Equations (17) and (14):

$$\alpha = \frac{-2f_{,1}}{1 + f_{,1}^2 + f_{,2}^2}, \quad (18)$$

$$\beta = \frac{-2f_{,2}}{1 + f_{,1}^2 + f_{,2}^2},$$

$$\gamma = \frac{1 - f_{,1}^2 - f_{,2}^2}{1 + f_{,1}^2 + f_{,2}^2}.$$

Figure 3:
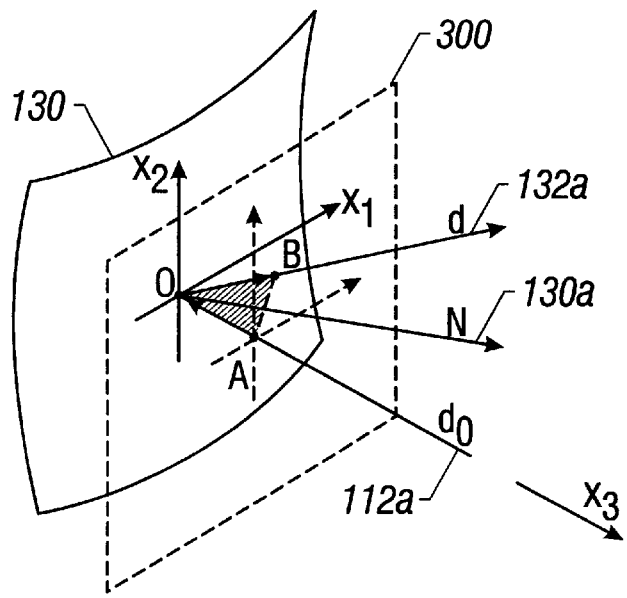
FIG. 3 is a diagram illustrating the reflection of a collimated probe beam at a specimen surface and respective coordinates for calculation.

FIG. 3 is a diagram illustrating the above reflection of the collimated probe beam 112 at the specimen surface 130. The unit vectors d, N, and $d_0$ are represented by numerals 132a, 130b and 112a, respectively. A flat surface 300, which is perpendicular to the unit vector 112a ($d_0$), is used as a reference surface to compute the phase distortion caused by the specimen surface 130. The unit vector 112a intercepts the reference surface 300 at a point A and the reflected unit vector 132a intercepts the reference surface 300 at a point B. Point O indicates the location at which a beam hits the specimen surface 130.

The change in the optical path length due to reflection from the curved specimen surface 130, as compared to reflection from a flat reference surface 300 can be determined as follows. Referring to FIG. 3, a plane OAB containing the unit incident and reflected vectors 132a(d) and 112a(d$_0$) at an arbitrary point O(x$_1$, x$_2$) can be used to compute a net change in optical path length at that point O(x$_1$, x$_2$) caused by the reflection:

$$S(x_1, x_2) = |\overline{OA}(x_1, x_2)| + |\overline{OB}(x_1, x_2)| \qquad (19)$$

$$= \left| \frac{f(x_1, x_2)}{d(x_1, x_2) \cdot e_3} d(x_1, x_2) \right| + |f(x_1, x_2)e_3|.$$

Thus, $$S(x_1, x_2) = f(x_1, x_2)\left( \frac{2}{1 - f_{,1}^2 - f_{,2}^2} \right). \qquad (20)$$

Assume the curvature variation of the specimen surface 130 is gradual (i.e., a shallow surface) so that $$|\nabla^2 f| << 1. \qquad (21)$$

Substitution of Equation (20) in Equation (9) yields the following:

$$\frac{\partial f(x_1, x_2)}{\partial x_\alpha} \approx \frac{n^{(\alpha)} p}{2\Delta}, \qquad (22)$$

$$n^{(\alpha)} = 0, \pm 1, \pm 2,$$

where $\alpha \in \{1, 2\}$. Equations (22) are the basic governing equations that relate CGS fringe contours to in-plane gradients of the specimen surface 130: x$_3$=f(x$_1$, x$_2$).

Figure 4A:
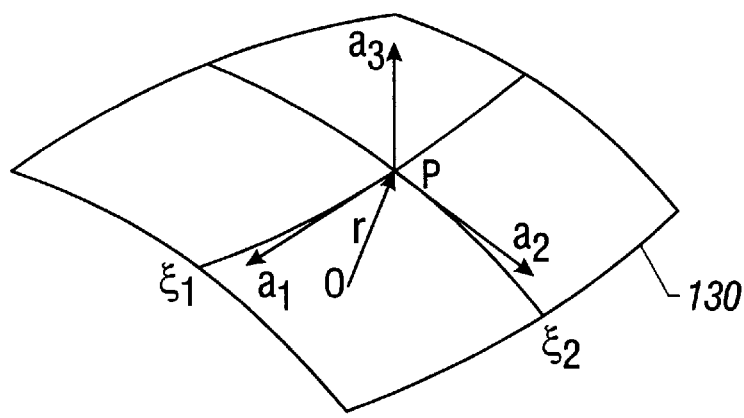
FIGS. 4A and 4B respectively show a curvilinear coordinate system and its respective local Cartesian coordinate system for a shallow surface with small curvatures.
Figure 4B:
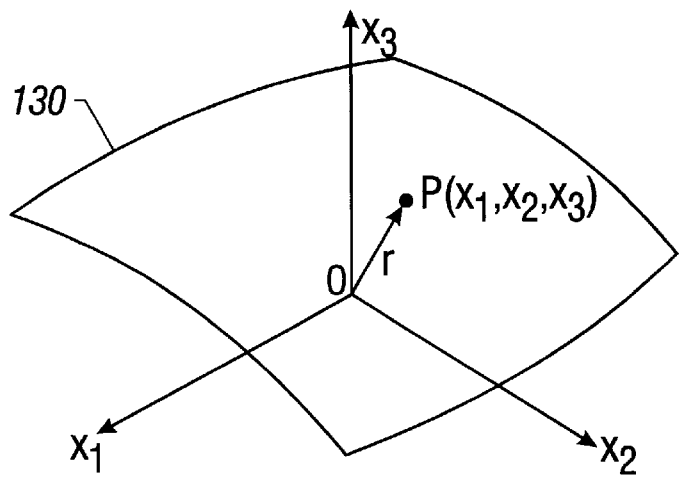

The curvature of the specimen surface 130 is in general defined by a curvature tensor in a curvilinear coordinate system. FIG. 4A shows curvilinear coordinates ($\xi_1$, $\xi_2$, $\xi_3$) and respective three curvilinear unit vectors a$_1$, a$_2$, a$_3$ where a$_1$ and a$_2$ are tangent to the curvilinear coordinate axes ($\xi_1$, $\xi_2$) and a$_3$ is a surface normal at a point P($\xi_1$, $\xi_2$) on the specimen surface 130:

$$a_3 = \frac{a_1 \times a_2}{|a_1 \times a_2|}. \qquad (23)$$

The unit tangent vectors, a$_1$ and a$_2$, are given in terms of a position vector, r($\xi_1$, $\xi_2$, $\xi_3$), of the point P($\xi_1$, $\xi_2$) as $a_\alpha = \partial r/\partial \xi_\alpha$, $\alpha \in \{1, 2\}$. The rate at which a$_3$ varies between neighboring points provides a measure of curvature at the point P of interest:

$$da_3 = \frac{\partial a_3}{\partial \xi_\alpha} d\xi_\alpha. \qquad (24)$$

Note that $\partial a_3/\partial \xi_\alpha$ are tangent vectors since $a_3 \cdot \partial a_3/\partial \xi_\alpha = 0$.

A curvature tensor $\kappa$ for the specimen surface 130 can be defined to represent the projections of the rate of change vectors $\partial a_3/\partial \xi_\alpha$ along the unit tangent vectors a$_1$ and a$_2$ as, $$K_{\alpha\beta} = -\frac{\partial a_3}{\partial \xi_\alpha} \cdot a_\beta, \qquad (25)$$

$$\alpha, \beta \in \{1, 2\}$$

which can be expressed in terms of the position vector r($\xi_1$, $\xi_2$, $\xi_3$):

$$K_{\alpha\beta} = a_3 \cdot \frac{\partial^2 r}{\partial \xi_\alpha \partial \xi_\beta} \cdot \alpha, \beta \in \{1, 2\} \qquad (26)$$

The tensor $\kappa = \{\kappa_{\alpha\beta}\}$ is a symmetric curvature tensor whose components $\kappa_{11}$ and $\kappa_{22}$ are termed as "normal curvatures" and $\kappa_{12}(=\kappa_{21})$ as "twist". The principal values of $\kappa_{\alpha\beta}$ are termed as the principal curvatures which are defined as the eigenvalues of curvature tensor $\{\kappa_{\alpha\beta}\}$.

When the specimen surface 130 is a shallow surface which can be represented by x$_3$=f(x$_1$, x$_2$), the curvilinear coordinate system ($\xi_1$, $\xi_2$, $\xi_3$) can be reduced to a simplified Cartesian coordinate system (x$_1$, x$_2$, x$_3$)

$$x_1 = \xi_1, x_2 = \xi_2, x_3 = f(\xi_1, \xi_2) = f(x_1, x_2), \qquad (27)$$

and $$r(x_1, x_2, x_3) = x_1 e_1 + x_2 e_2 + f(x_1, x_2) e_3. \qquad (28)$$

The curvature tensor is thus given by, $$K_{\alpha\beta} = a_3 \cdot \frac{\partial^2 r}{\partial x_\alpha \partial x_\beta} = \frac{f_{,\alpha\beta}}{\sqrt{1 + f_{,1}^2 + f_{,2}^2}}, \quad \alpha, \beta \in \{1, 2\}. \qquad (29)$$

For small curvatures satisfying Equation (21), Equation (29) can be approximated as, $$K_{\alpha\beta}(x_1, x_2) \approx \frac{\partial^2 f(x_1, x_2)}{\partial x_\alpha \partial x_\beta} \qquad (30)$$

$$\approx \frac{p}{2\Delta}\left( \frac{\partial n^{(\alpha)}(x_1, x_2)}{\partial x_\beta} \right), \quad n^{(\alpha)} = 0, \pm 1, \pm 2, \ldots$$

where, $\alpha, \beta \in \{1, 2\}$.

Equation (30) directly relates the curvature tensor fields to the gradients of a CGS interferogram. For a given CGS system with certain parameters $\rho$ and $\Delta$, the curvature at any location on a specimen surface can be determined by measuring the number of fringes per unit length in desired directions. Thus, a CGS interferogram provides a full field technique for determining the instantaneous value of the specimen curvature tensor at any point, (x$_1$, x$_2$).

Certain approximations have been made in the above discussion to simplify the relation between the gradient field of a CGS interferogram and the curvature tensor field for purpose of illustrating the principles of the invention. For example, the diffraction angle, $\theta$, has been assumed to be small so the approximations in Equations (3) and (4) are valid. For another example, the curvature of a specimen surface has been assumed to be gradual (i.e., a shallow surface) under Equation (21). Such approximations are in general weak and are valid in many practical applications. However, it should be understood that a relation between the gradient field of a CGS interferogram and the curvature tensor field more complex than Equation (30) can be established without these approximations. In general, the relation may not be expressed in a simple analytical form and require numerical solutions.

Figure 5:
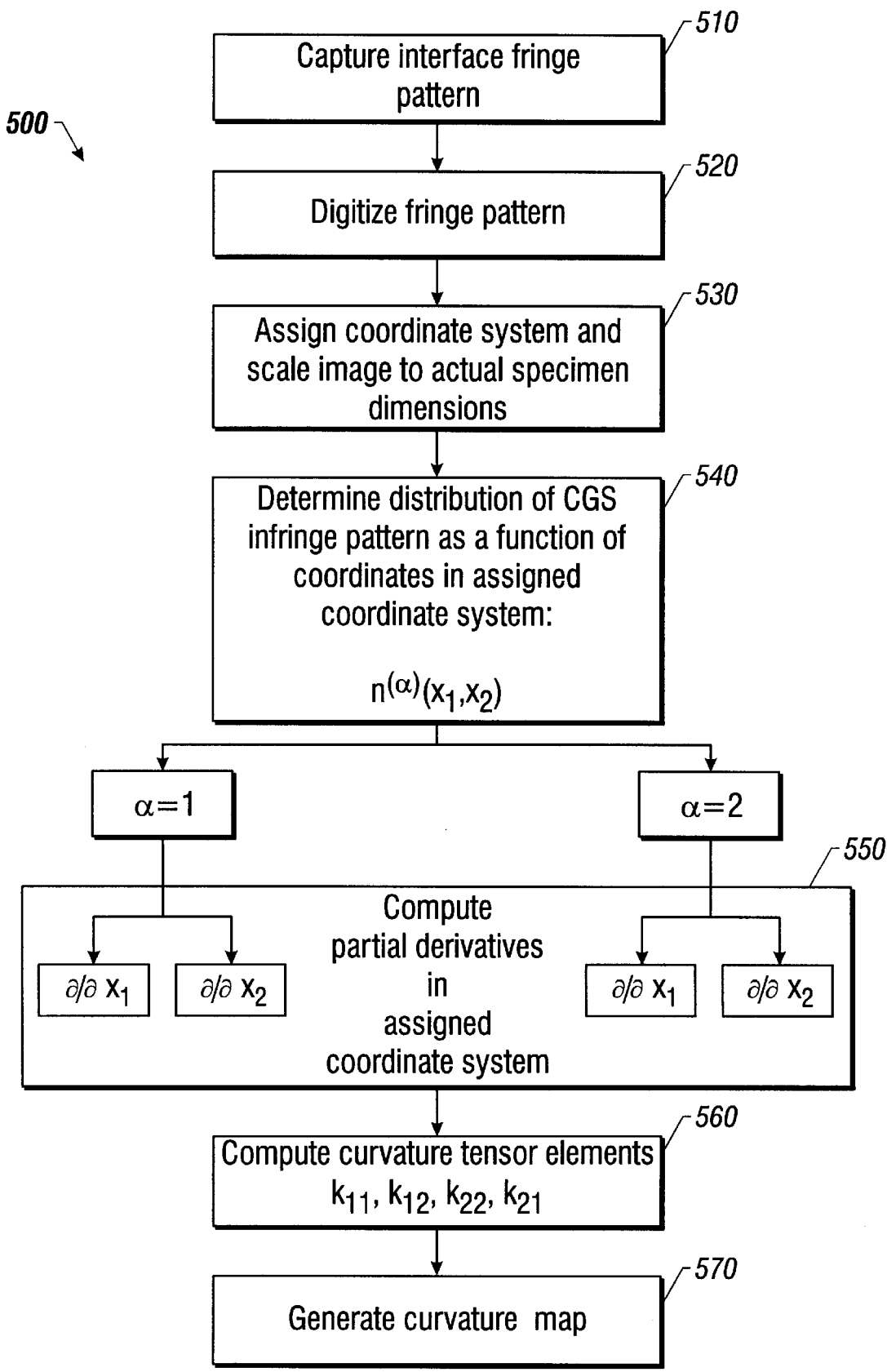
FIG. 5 is a flowchart illustrating a preferred process for determining the curvature of a specimen surface using the system shown in FIG. 1 based the CGS technique in accordance with one embodiment of the invention.

FIG. 5 is a flowchart showing a preferred process for determining the curvature of a specimen surface using the above CGS technique. This process is implemented in the system 100 of FIG. 1 by programming the signal processor 190. At step 510, the CGS image of a specimen is obtained by using the system 100 of FIG. 1. The CGS image is digitized at step 520. At step 530, a coordinate system is assigned to the CGS image such that each location on the surface of the specimen is registered in the coordinate system and the coordinates of the CGS image have a known relation with the actual specimen dimensions.

Next at step 540, the distribution of the CGS infringes as a function of the coordinates in the assigned coordinate system is determined. For a shallow surface, a local Cartesian coordinate system $(x_1, x_2)$ can be used and fringe distribution functions $n^{(1)}(x_1, x_2)$ and $n^{(2)}(x_1, x_2)$ respectively corresponding to two mutually orthogonal directions $e_1$ and $e_2$ can be determined. At step 550, partial derivatives of the fringe distribution functions $n^{(1)}(x_1, x_2)$ and $n^{(2)}(x_1, x_2)$ with respect to $x_1$ and $x_2$ are computed to obtain $\partial n^{(1)}/\partial x_1$, $\partial n^{(1)}/\partial x_2$, $\partial n^{(2)}/\partial x_1$, and $\partial n^{(2)}/\partial x_2$. At step 560, Equation (30) is used to calculate the curvature tensor elements $\kappa_{11}$, $\kappa_{12}$, $\kappa_{22}$ and $\kappa_{21}$ for each and every location in the specimen surface. A curvature map of the specimen surface can thus be obtained for further analysis (step 570).

The techniques of CGS and high-resolution x-ray diffraction were used simultaneously to determine curvatures for two different specimens with single-crystal substrates for comparison. The two specimens, named "multilayer-A" and "multilayer-B", were manufactured by M.I.T.'s Lincoln Laboratories (Lexington, Mass.) and comprised of multi-layered thin films deposited on single crystal silicon wafers. The layered structure of the two specimens obtained using Rutherford Back Scattering is tabulated in Table 1.

TABLE 1

| Layers | Multilayer-A | Multilayer-B |
| --- | --- | --- |
| TiN | — | 50 nm |
| Al-x % Si | 500 nm | 500 nm |
| Ti | 30 nm | 30 nm |
| TiN | 100 nm | 100 nm |
| SiO$_2$ | 420 nm | 420 nm |
| Si (substrate) | 506 μm | 506 μm |

In actual measurements, separate CGS interferograms were obtained for wave front shearing in two different (preferably orthogonal) directions. These interferograms were then digitized and numerically differentiated to determine components of the curvature tensor field as per Equation (30). The X-ray diffraction measurement was used to determine the curvatures of both samples along the $x_2$-direction in uniform steps of 1 mm based on diffraction from the Si (1 0 0) crystallographic planes.

Since high-resolution x-ray diffraction only measures averaged curvatures, the CGS data was also averaged to facilitate a direct comparison of curvatures obtained using the two techniques. Averaging of the curvature fields obtained using CGS was done in the center of the specimen, since this is the area where x-ray diffraction measures average curvature.

TABLE 2

| | Multilayer-A | | Multilayer-B | |
| --- | --- | --- | --- | --- |
| Curvature | CGS | X-Ray | CGS | X-Ray |
| $\kappa_{11}$ | 0.039m$^{-1}$ | — | 0.024m$^{-1}$ | — |
| $\kappa_{22}$ | 0.048m$^{-1}$ | 0.050 m$^{-1}$ | 0.039m$^{-1}$ | 0.042 m$^{-1}$ |
| $\kappa_{12} = \kappa_{21}$ | −0.014m$^{-1}$ | — | −0.004m$^{-1}$ | — |

Table 2 lists the averaged curvature measurement using the two techniques for both multilayer-A and multilayer-B specimens. The measured results in $\kappa_{22}$ indicate a good agreement between the two techniques. Note that direct comparison between the absolute curvatures measured by CGS and the relative curvatures measured by x-ray diffraction was possible in these cases because a reference specimen used to calibrate the x-ray diffraction technique was very flat and had a curvature of $\kappa < 0.002$ m$^{-1}$, as determined by CGS.

Therefore, the above CGS technique for curvature measurement can provide a full-field, non-invasive optical tool for measuring specimen curvature fields in a specularly reflective surface such as thin film structures. The following examples are used to further demonstrate the application of the present invention in measuring curvature fields in a variety of thin films and micro-mechanical structures.

The system 100 shown in FIG. 1 has two gratings 140 and 150 to perform the spatial shearing of different diffraction orders. In a preferred implementation, the rulings of the two gratings are parallel so that the spatial shearing is perpendicular to the rulings. In the process shown in FIG. 5, the spatial shearing should be performed in at least two different directions such as two orthogonal directions to obtain the curvature map of a surface.

One way to achieve spatial shearing in two directions is to place the specimen 130 on a rotating stage in the system 100. A CGS interferogram for one shearing direction is first obtained. The specimen 130 is then rotated to another direction to obtain a second CGS interferogram for the second direction.

Figure 6:
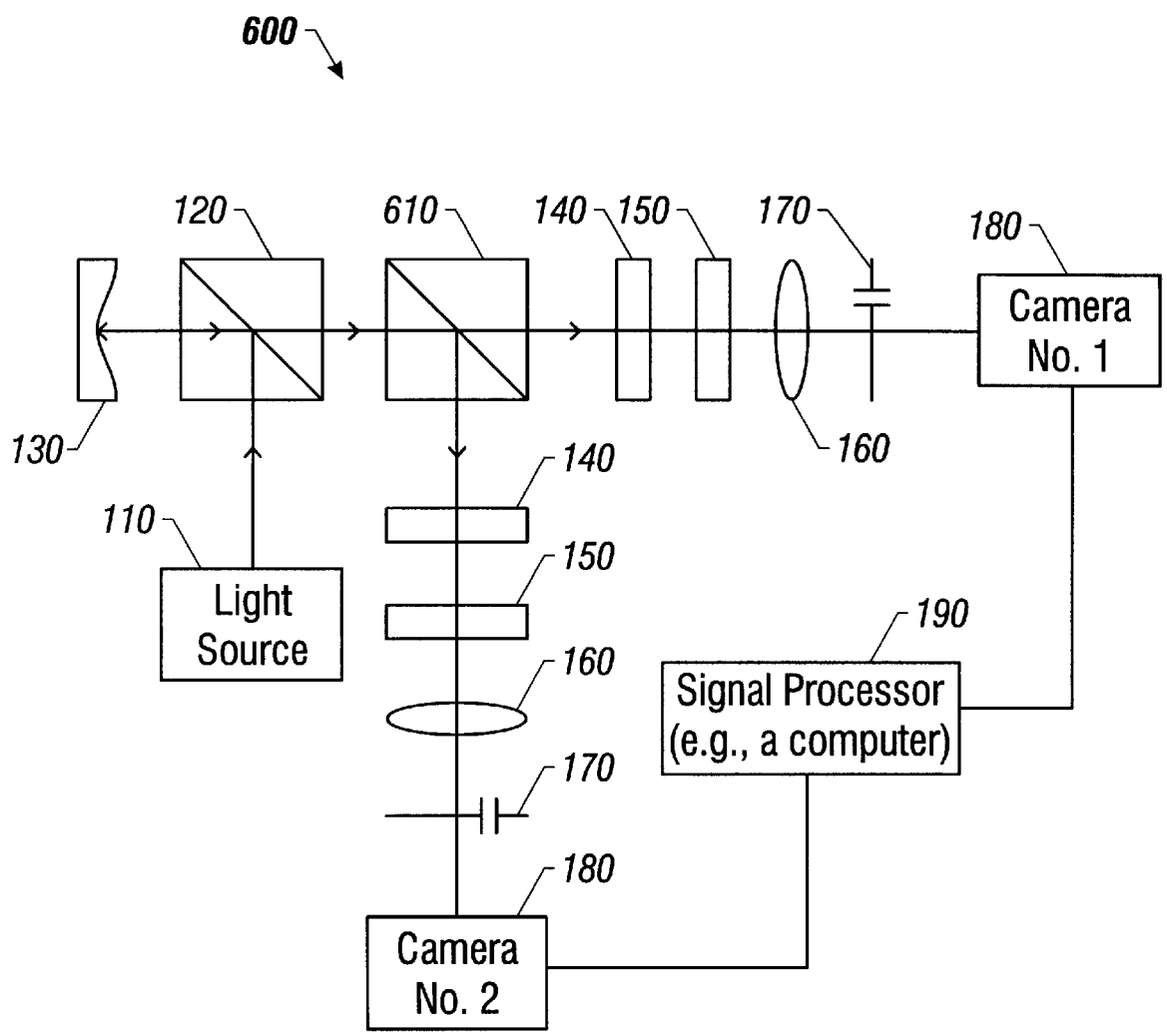
FIG. 6 is a diagram showing one embodiment having two optical arms for two different shearing directions.

Another way uses two separate optical arms to simultaneously perform the spatial shearing in two directions. FIG. 6 is a diagram showing one embodiment 600 having two optical arms. A beam splitter 610 splits the reflected probe beam from the specimen 130 into two beams that are sent into two different optical arms. The two gratings in each optical arm may be parallel to each other but are perpendicular to the grating direction of another arm. This configuration can be configured to obtain CGS interferograms in two different shearing directions in essentially the same time so that time-varying effects on the curvature of the specimen surface 130 can be properly measured.

Figure 7A:
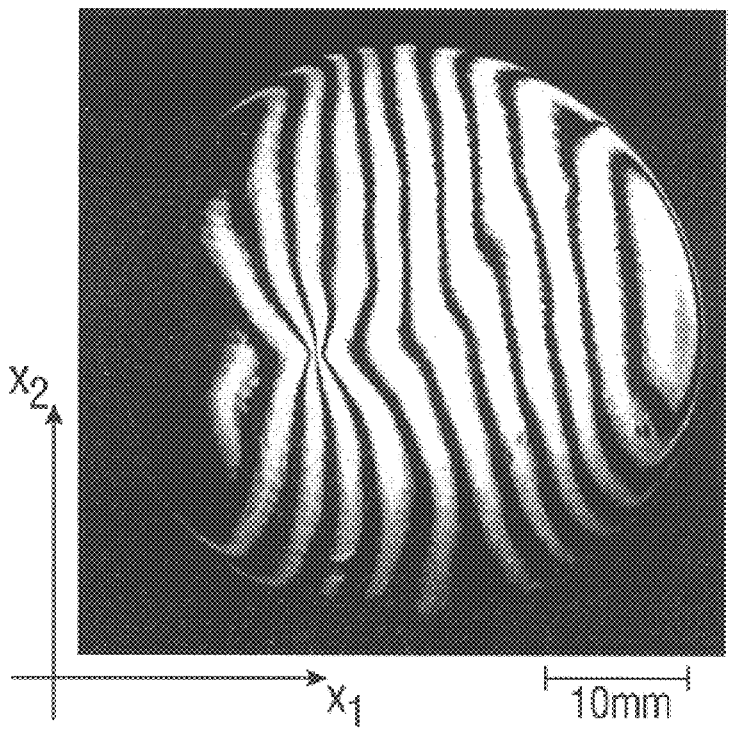
FIGS. 7A and 7B show the CGS interferograms obtained for a chromium-coated silicon wafer for two orthogonal shearing directions $x_1$ and $x_2$, respectively.
Figure 7B:
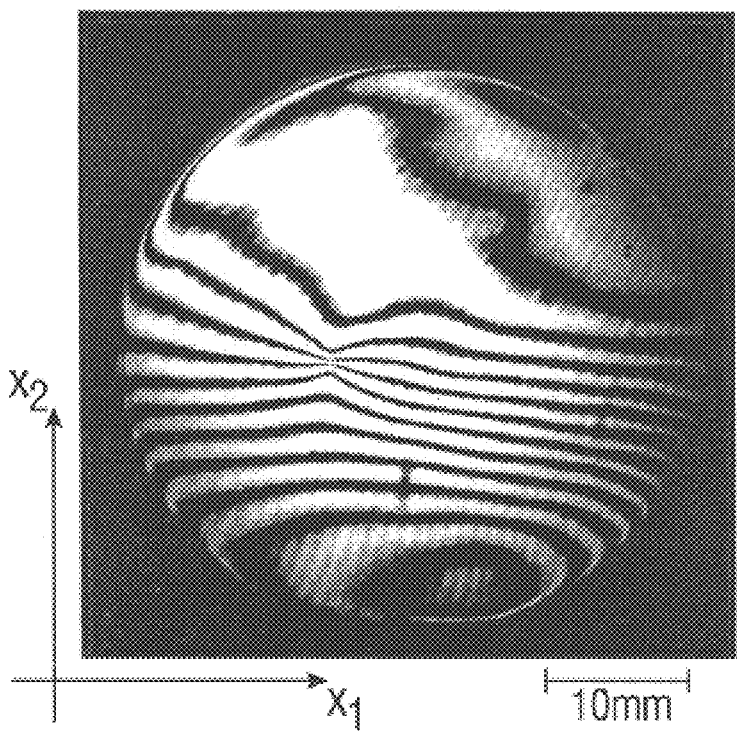
Figure 7C:
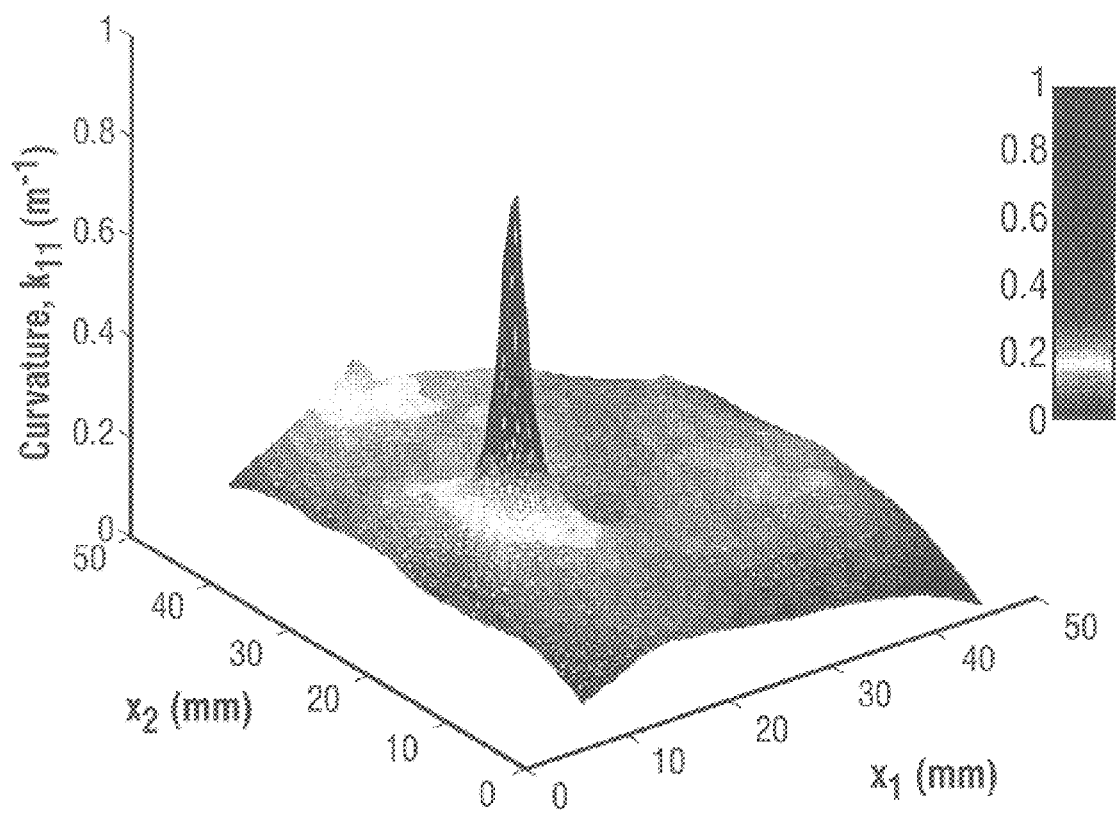
FIGS. 7C and 7D are charts of the resultant maps of normal curvature components, $\kappa_{11}$ and $\kappa_{22}$, corresponding to the CGS interferograms in FIGS. 7A and 7B, respectively.
Figure 7D:
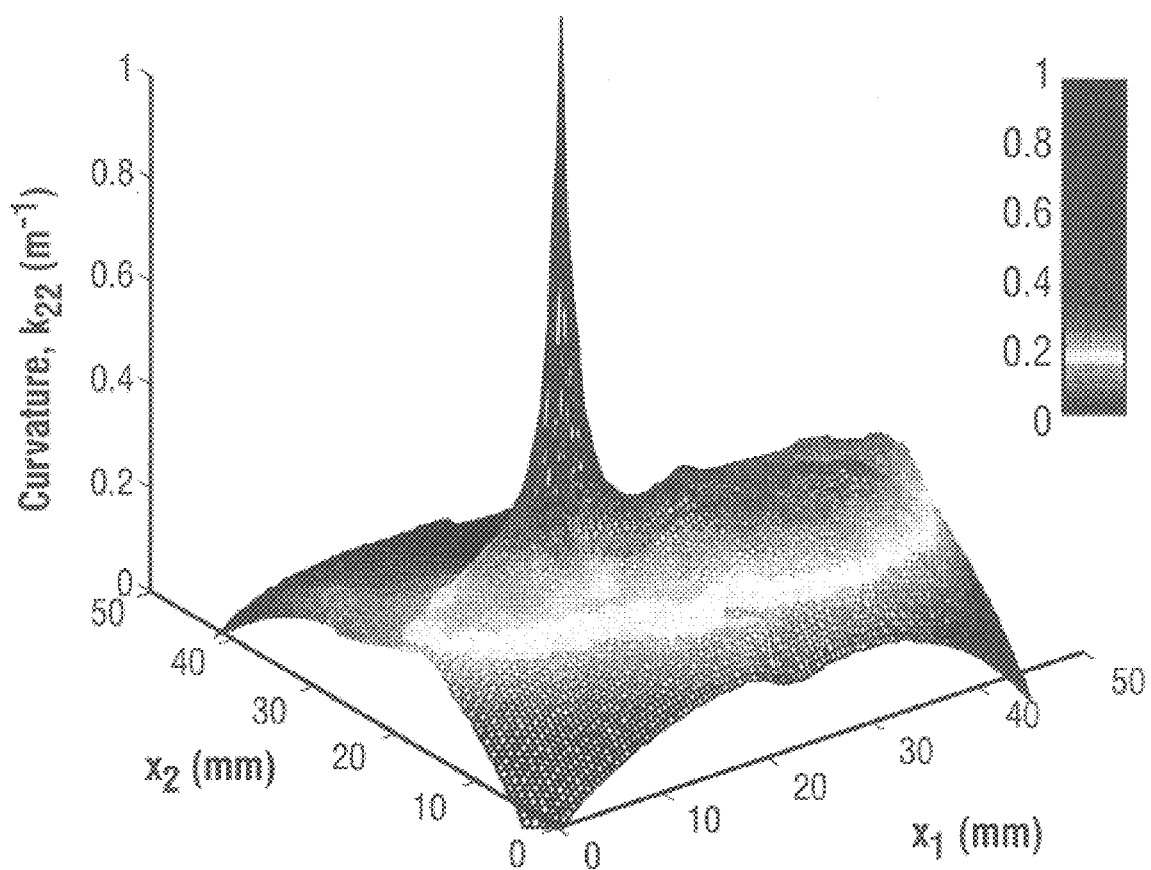

FIGS. 7A and 7B show the CGS interferograms obtained for a chromium-coated silicon wafer (320 nm Cr/324 μm Si) respectively for two orthogonal shearing directions $x_1$ and $x_2$. A localized defect is evident in the CGS interferograms. The components of the curvature tensor field of this thin-film surface can be determined by using the method shown in FIG. 5 based on Equation (30). The resultant normal curvature components, $\kappa_{11}$ and $\kappa_{22}$, are plotted in FIGS. 7C and 7D, respectively, in which the peaks represent the curvatures of the defect.

Hence, the techniques disclosed herein are capable of detecting highly localized surface anomalies or singularities in a surface. This is in part due to the full field nature of these techniques. Other commonly-used curvature measurement methods, such as high resolution x-ray diffraction or laser scanning techniques, provide point-wise information and could miss such localized defects. Other techniques may be able to generate full-field curvature maps by scanning. However, these scans require a certain amount of scanning time and may not be adequate for time-varying, non-uniform surface curvature fields such as a growing delamination due to thermal cycling. The techniques disclosed herein, in contrast, can produce a full-field map of the entire surface curvature fields in a relatively short time to nearly continuously track the change in the surface curvature.

Figure 8A:
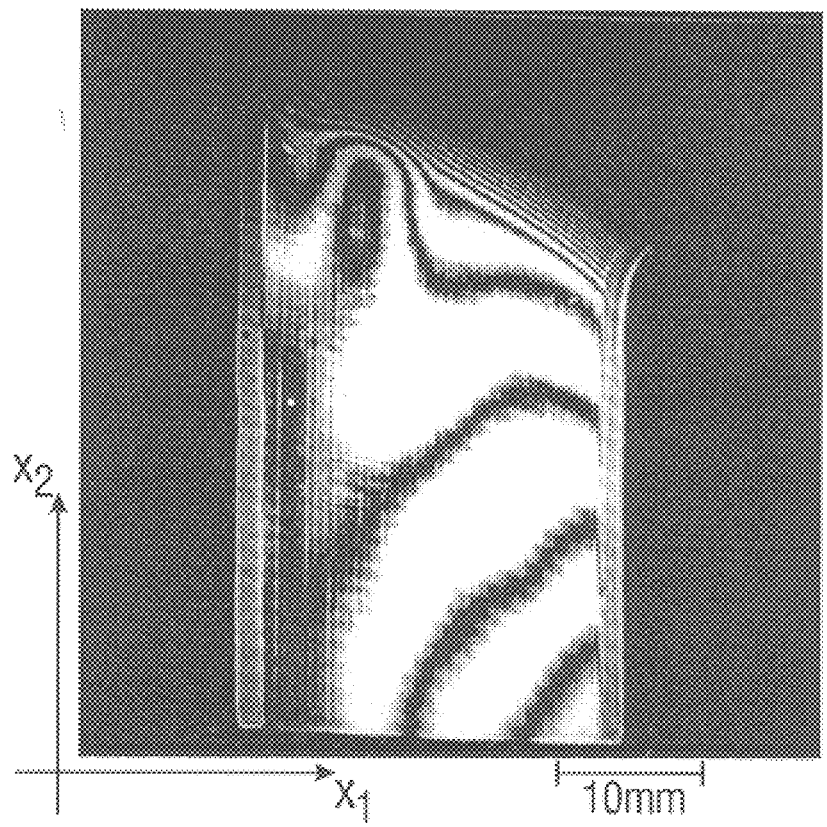
FIGS. 8A and 8B are diagrams showing CGS interferograms obtained for an aluminum-coated silicon wafer with patterned lines for two orthogonal shearing directions $x_1$ and $x_2$, respectively.
Figure 8B:
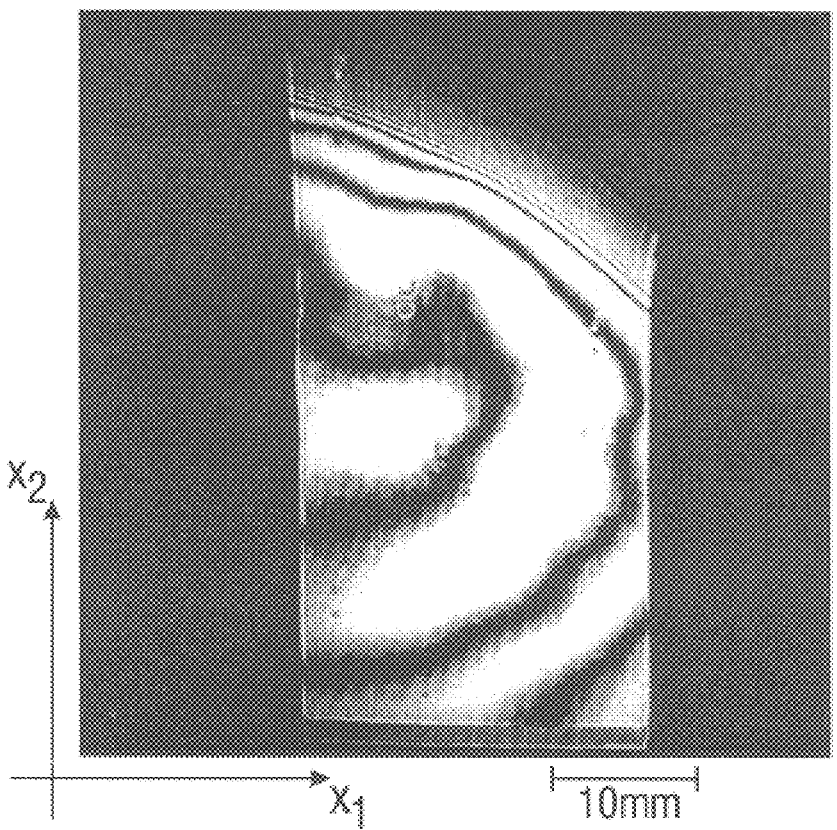
Figure 8C:
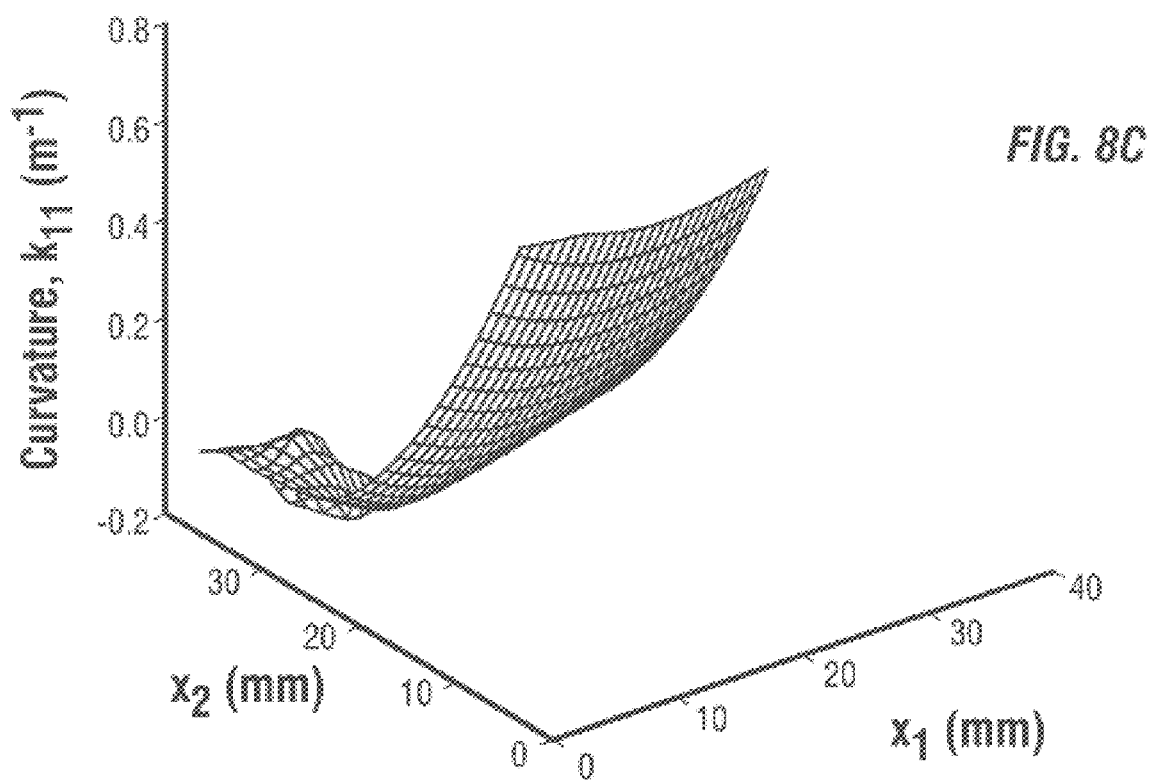
FIGS. 8C and 8D are charts respectively showing the maps of the normal curvature field components, $\kappa_{11}$ and $\kappa_{22}$ for the CGS interferograms of FIGS. 8A and 8B.
Figure 8D:
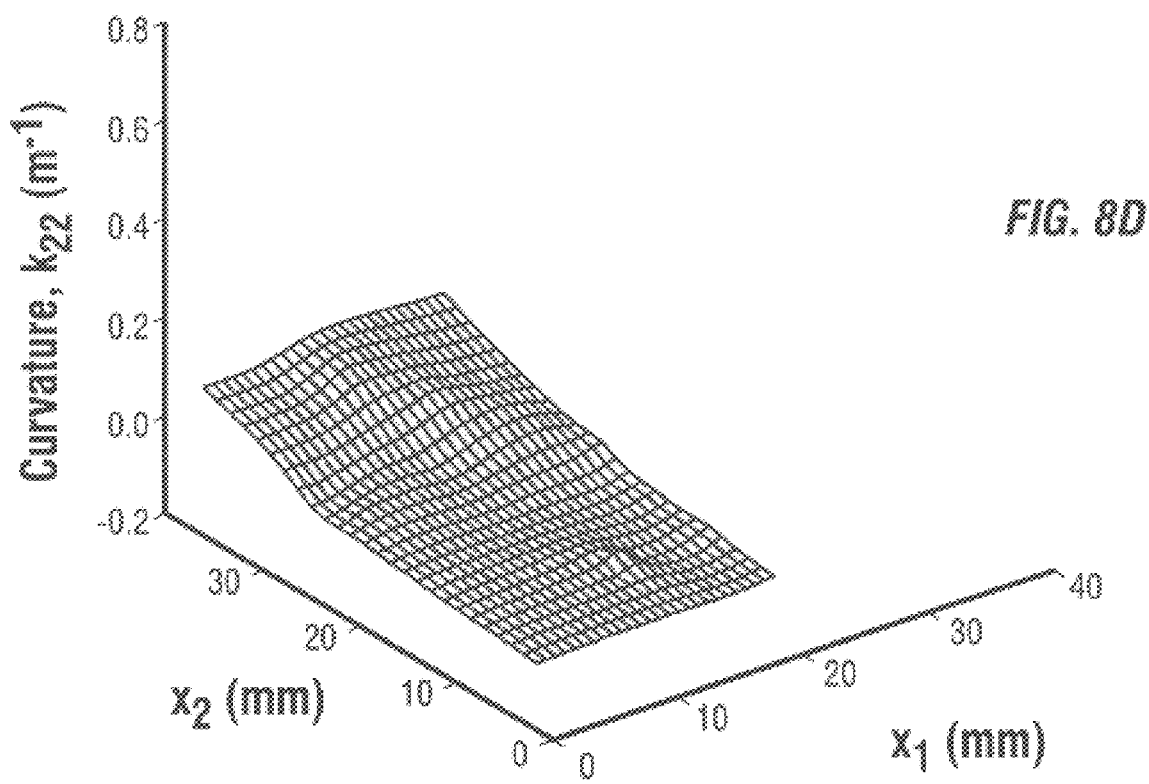

The techniques disclosed herein may also be used to measure curvature of a reflective surface with patterned lines or other structures in addition to uniformly coated surfaces. FIGS. 8A and 8B show CGS interferograms obtained for an aluminum-coated silicon wafer with patterned lines for two orthogonal shearing directions $x_1$ and $x_2$, respectively. The specimen was fabricated by deposition of a uniform film made of Al and 1% of Si and about 500 nm thick on a silicon wafer of about 520 µm thick using an R.F. magnetron. Subsequently, the aluminum coating is patterned to form lines with widths ranging from 10 µm to 100 µm using photolithography and etching. The CGS interferograms were analyzed in accordance with Equation (30) to determine components of the curvature tensor field. FIGS. 8C and 8D respectively show the maps of the normal curvature field components, $\kappa_{11}$ and $\kappa_{22}$.

Figure 9A:
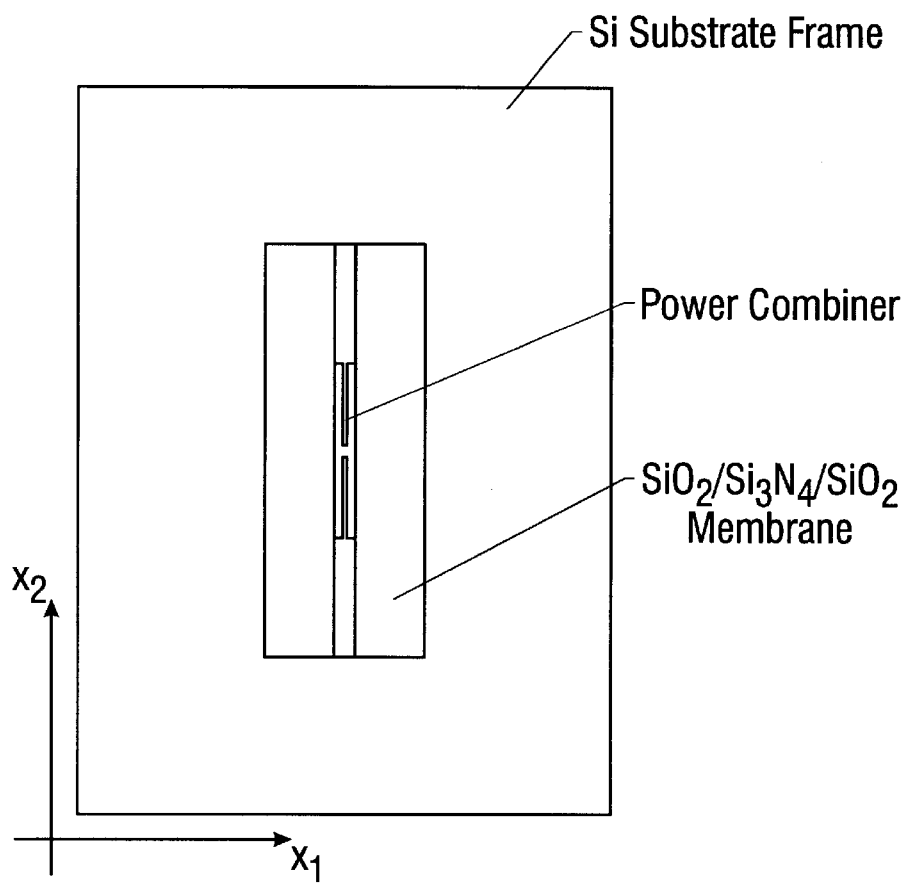
FIG. 9A is a diagram of a bottom view of a Wilkinson power-combiner formed on a Si substrate by using microstrip lines on a thin dielectric membrane.

The CGS technique was also used to measure the curvature of a membrane structure in microwave transmission lines supported on micron-thin dielectric membranes. FIG. 9A shows the bottom view of a Wilkinson power-combiner formed on a Si substrate by using microstrip lines on a thin (1.4 micron) dielectric membrane. The membrane is a tri-layer of $SiO_2/Si_3N_4/SiO_2$ which is grown on the silicon substrate using thermal oxidation and low pressure chemical vapor deposition. Deposition conditions and layer thickness are controlled to minimize stresses (and curvatures) in the multilayer structure. The membrane is left free-standing by selective chemical etching of the silicon to open a window in the substrate beneath the conducting lines.

The mechanical stability and low stresses of the membrane structure are crucial for the performance and long term reliability of the circuit. Conventional X-ray diffraction techniques cannot be used to determine the stresses and/or curvatures in such membrane structures since the membranes themselves are amorphous and are not supported on any substrate (either crystalline or amorphous).

Figure 9B:
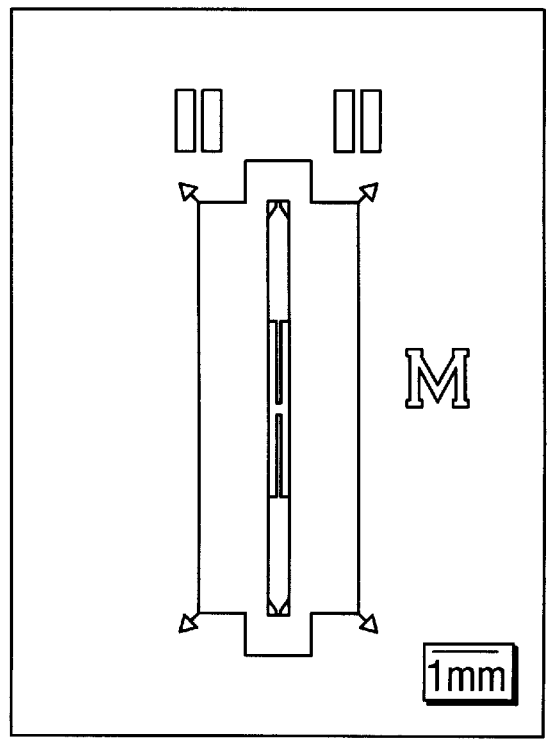
FIG. 9B is a diagram showing the respective CGS interferogram of the Wilkinson power-combiner of FIG. 9A for shearing along the $x_2$-direction.

The CGS technique only requires the surface to be specularly reflective and hence can be used for measuring such structure. FIG. 9B shows the CGS interferogram of the Wilkinson power-combiner for shearing along the $x_2$-direction. Using Equation (30), the membrane structure was found to be very "flat" and have a normal curvature component of $\kappa_{22}<0.015 \text{ m}^{-1}$.

The above examples demonstrate that the above CGS system and method for measuring the curvature provide several advantages including real-time, remote, non-intrusive, full-field measurements of curvature. Moreover, since it provides out-of-plane gradients of the specimen surface topography, $x_3=f(x_1, x_2)$, the technique is not sensitive to rigid body rotation or displacement of the specimen surface. Thus, unlike many conventional interferometric techniques, such as Twyman-Green interferometry, CGS is relatively vibration insensitive. In addition, only one differentiation operation of the experimental data is required to obtain curvature based on the gradients of surface topography. This eliminates two successive differentiation operations which are often required in other interferometric techniques, thereby reducing the errors associated with the differentiation operations. The processing time in data extraction is also reduced. Furthermore, the application of CGS requires only a specularly reflective surface and can be applied in a wide range of applications involving curvature measurement. In contrast, x-ray diffraction methods require the substrate to be a single crystal.

One application of the above CGS system and method for measuring the curvature is to determine stresses of an object with a reflective surface based on a correlation between the curvature change and the stress. Such a correlation is well known. Examples of theoretical models for such correlation include Stoney's approximate plate theory disclosed in Proceedings of the Royal Society, London, Series A, vol. 82, pp. 172(1909), Finot and Suresh's approximate plate theory disclosed in Journal of the Mechanics and Physics of Solids, vol. 44(5), pp.683(1996), and a continuum mechanics formulation developed by Freund, Journal of Crystal Growth, vol. 132, pp.341(1993) and Journal of the Mechanics and Physics of Solids, vol. 44(5), pp.723 (1996), which are incorporated herein by reference.

For example, the stresses in an integrated circuit element with multiple layers of thin films on a Si substrate can be measured. First, the circuit element is positioned in the system 100 and the CGS interferogram of a selected area is obtained. Next, the operation shown in FIG. 5 is carried out to generate a curvature map of the selected area on the circuit element. Finally, the stresses in the selected area is determined.

Although the present invention has been described in detail with reference to a few embodiments, various modifications and enhancements may be made without departing from the scope and spirit of the invention. For example, in the system shown in FIG. 1, the light source 110 may include a coherent or incoherent light-emitting device and the probe beam 112 may include a single wavelength or multiple wavelengths. When an incoherent light-emitting device is used, a pinhole may be placed in front of the device to produce coherent light. In addition, the specimen surface 130 may in general be formed of any material, including but not limited to, amorphous or crystalline materials. An amorphous or crystalline material may form a support layer under the specimen surface 130. All these and other variations and modifications are intended to be encompassed by the following claims.

What is claimed is:

1. A coherent optical system for measuring curvatures of specularly reflective surfaces, comprising:

a light source configured to produce a substantially collimated coherent probe beam to impinge upon a specularly reflective surface so as to produce a reflected probe beam that has phase information of different points within an illuminated area;

first and second gratings spaced relative to each other in an optical path of said reflected probe beam and configured to produce a predetermined phase manipulation on a wavefront of said reflected probe beam, wherein said predetermined phase manipulation is produced by diffractions that are produced by said first and second gratings;

an optical element positioned to receive said reflected probe beam from said first and second gratings and configured to select and combine two diffraction components from said second grating to produce an interference pattern, wherein said selected two diffraction components are produced by said second grating from diffracting two different diffraction components from said first grating and are substantially parallel to each other;

an optical sensing device disposed relative to said optical element to receive said interference pattern and produce an electrical signal indicative of said interference pattern; and a signal processor connected to receive said electrical signal and configured to extract a spatial gradient information on the wavefront of said reflected probe beam caused by a curvature of said specularly reflective surface, wherein said signal processor determines said curvature of said specularly reflective surface according to said spatial gradient information.

2. A system as in claim 1, wherein said first and second gratings effect a relative spatial displacement between said two selected diffraction components from said second grating.

3. A system as in claim 1, wherein rulings of said first and second gratings are parallel in a selected direction.

4. A system as in claim 1, wherein said first and second gratings have the same grating period.

5. A system as in claim 1, wherein said optical element is a lens and further comprising a spatial filter placed approximately one focal length away from said lens.

6. A system as in claim 1, wherein said signal processor comprises a digitizer to convert said electrical image into an digital image.

7. A system as in claim 1, wherein said signal processor is programmed for:
assigning a coordinate system to said digital image;
producing a scaling factor to associate dimensions of said digital image to dimensions of said specularly reflective surface;
determining a distribution of fringes in said interference pattern as a function of coordinates in said assigned coordinate system;
performing partial derivatives on said distribution of fringes with respective to said coordinates; and
determining a curvature tensor for said specularly reflective surface according to said partial derivatives to indicate a curvature at any location on said surface illuminated by said probe beam.

8. A system as in claim 1, wherein said signal processor is further programmed to determine stresses on said specularly reflective surface according to a correlation between said curvature and said stresses.

9. A system as in claim 1, wherein said optical sensing device includes an array of photosensing pixels that are operable to produce electrical signals in response to photons, said electrical signals representing said electrical image.

10. A system as in claim 1, further comprising a rotation stage disposed relative to said light source and said first and second gratings and configured to hold said specularly reflective surface, wherein a rotation of said rotation stage produces phase modulations with respect to different relative directions between said first and second gratings and said specularly reflective surface.

11. A coherent optical system for measuring curvatures of a specularly reflective surface, comprising:
an light source to project a substantially collimated coherent probe beam onto the specularly reflective surface to obtain phase information on different points within an illuminated area;
a beam splitter receiving a reflected probe beam from the specularly reflective surface and dividing said reflected probe beam into a first reflected probe beam and a second reflected probe beam;
a first optical path positioned relative to said beam splitter to receive said first reflected probe beam and configured to comprise:
  a first pair of gratings spaced relative to each other to produce a first spatial displacement along a first direction between two substantially parallel diffraction components of said first reflected probe beam that are respectively generated from diffraction of two different diffraction orders by said first pair of gratings;
  a first lens positioned to receive said first reflected probe beam from said first pair of gratings and configured to select and combine said two selected diffraction components to produce a first interference pattern; and
  a first optical sensing device disposed relative to said first lens to receive said first interference pattern and produce a first electrical image indicative of said first interference pattern;
a second optical path positioned relative to said beam splitter to receive said second reflected probe beam and configured to comprise:
  a second pair of gratings spaced relative to each other to produce a second spatial displacement along a second direction between two substantially parallel diffraction components of said second reflected probe beam that are respectively generated from diffraction of two different diffraction orders by said second pair of gratings;
  a second lens positioned to receive said second reflected probe beam from said second pair of gratings and configured to select and combine said two selected diffraction components to produce a second interference pattern;
  a second optical sensing device disposed relative to said second lens to receive said second interference pattern and produce a second electrical image indicative of said second interference pattern; and
  a signal processor connected to receive said first and second electrical images and configured to extract a spatial gradient information on a wavefront of said reflected probe beam caused by a curvature of said specularly reflective surface, wherein said signal processor is programmed to determine said curvature of said specularly reflective surface according to said spatial gradient information.

12. A system as in claim 11, wherein said signal processor is operable to covert said first and second electrical images into first and second digital images and is programmed for:
assigning a coordinate system to each of said digital images;
producing a scaling factor to associate dimensions of each digital image to dimensions of said specularly reflective surface;
determining a distribution of fringes in each of said first and second interference patterns as a function of coordinates in said assigned coordinate system;
performing partial derivatives on said distribution of fringes with respective to said coordinates; and
determining a curvature tensor for said specularly reflective surface according to said partial derivatives to provide a full-field curvature map of said surface illuminated by said probe beam.

13. A method for measuring surface curvature, comprising:
illuminating a substantially collimated coherent probe beam onto a specularly reflective surface of an element to produce a reflected probe beam;
producing a first set of diffraction components of said reflected probe beam by using a first grating positioned relative to said element;
producing a second set of diffraction components of said reflected probe beam by using a second grating spaced from said first grating by a predetermined distance, wherein each of first set of diffraction components is diffracted by said second grating to produce a plurality of diffraction components;

combining two substantially parallel diffraction components that are produced by said second grating from diffracting two different diffraction components selected from said first set of diffraction components to produce an interference pattern; and processing said interference pattern to extract spatial phase variations along two different directions that arr both perpendicular to each point within an illuminated area on said specularly reflective surface to provide a full-field curvature map of said illuminated area.

14. A method as in claim 13, wherein said element is semiconductor device having patterned structures formed on a substrate.

15. A method as in claim 13, wherein said element is formed of an amorphous material.

16. A method as in claim 13, wherein processing said interference pattern includes:

assigning a coordinate system to said interference pattern having two coordinate axes perpendicular to a normal of each point on said specularly reflective surface;

producing a scaling factor to associate dimensions of said interference pattern to dimensions of said specularly reflective surface;

determining a distribution of fringes in said interference pattern as a function of coordinates in said assigned coordinate system;

performing partial derivatives on said distribution of fringes with respective to said coordinates of said two coordinate axes; and determining a curvature tensor for said specularly reflective surface according to said partial derivatives to provide said full-field curvature map.

17. A method as in claim 16, further comprising correlating said curvature tensor with stress to determine a stress distribution on said surface.

18. A coherent optical system for measuring curvatures of specularly reflective surfaces, comprising:

a light source configured to produce a substantially collimated coherent probe beam to impinge upon a specularly reflective surface so as to produce a reflected probe beam that has phase information of different points within an illuminated area;

first and second gratings spaced relative to each other in an optical path of said reflected probe beam and configured to produce a predetermined phase manipulation on a wavefront of said reflected probe beam;

a combining optical element positioned to receive said reflected probe beam from said first and second gratings and configured to select and combine two diffraction components from said second grating to produce an interference pattern, wherein said selected two diffraction components are produced by said second grating from diffracting two different diffraction components from said first grating;

an optical sensing device disposed relative to said optical element to receive said interference pattern and produce an electrical signal indicative of said interference pattern; and a signal processor connected to receive said electrical signal and configured to extract spatial phase variations along two different directions that are both perpendicular to each point within an illuminated area on said specularly reflective surface to provide a full-field curvature map of said illuminated area.

\* \* \* \* \*

UNITED STATES PATENT AND TRADEMARK OFFICE
CERTIFICATE OF CORRECTION

PATENT NO. : 6,031,611
DATED : FEBRUARY 29, 2000
INVENTOR(S) : RAMAN P. SINGH, NICHOLAS R. MOORE, JR., ARES J. ROSAKIS AND ELIZABETH A. KOLAWA

It is certified that error appears in the above-identified patent and that said Letters Patent is hereby corrected as shown below:

[22] Filed: June 3, 1998

Column 2, line 11, change "produce" to --produces--.

Column 15, line 50, change "an" to --a--.

Signed and Sealed this

Twenty-ninth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,031,611
DATED : February 29, 2000
INVENTOR(S) : Ares J. Rosakis et al.

It is certified that error appears in the above-identified patent and that said Letters Patent is hereby corrected as shown below:

<u>Title page,</u>
Item [75], Inventors, change "Ramen" to -- Raman --.

Signed and Sealed this

Twelfth Day of October, 2004

JON W. DUDAS
*Director of the United States Patent and Trademark Office*